United States Patent [19]

Gibson

[11] 4,000,913

[45] Jan. 4, 1977

[54] LIGHTWEIGHT HIGH STRENGTH AUXILIARY LIFT AXLE SUSPENSION SYSTEM FOR HIGH FRAMED VEHICLES

[75] Inventor: Gordon L. Gibson, Scottville, Mich.

[73] Assignee: TWM Manufacturing Company, Inc., Canton, Ohio

[22] Filed: Nov. 8, 1974

[21] Appl. No.: 522,186

[52] U.S. Cl. .................................. 280/704; 267/31
[51] Int. Cl.² ...................................... B60G 11/46
[58] Field of Search ......... 280/124 F, 81 R, 106 R, 280/704; 180/24, 24.02; 267/18, 23, 24, 31

[56] References Cited

UNITED STATES PATENTS

| | | | |
|---|---|---|---|
| 3,031,179 | 4/1962 | Peirce | 267/31 |
| 3,448,975 | 6/1969 | Verdi | 267/31 |
| 3,617,072 | 11/1971 | Turner | 280/124 F |
| 3,625,545 | 12/1971 | Somers | 280/106 T |
| 3,664,681 | 5/1972 | Thaxton | 280/124 F |
| 3,730,548 | 5/1973 | Thaxton | 280/124 F |
| 3,730,549 | 5/1973 | Turner | 280/124 F |
| 3,730,550 | 5/1973 | Thaxton | 280/124 F |
| 3,785,673 | 1/1974 | Harbers | 280/124 F |
| 3,861,708 | 1/1975 | Fier | 280/124 F |
| 3,866,894 | 2/1975 | Sweet | 280/124 F |
| 3,877,718 | 4/1975 | Scanlon | 180/24.02 |
| 3,940,162 | 2/1976 | Winslow | 280/106 R |

*Primary Examiner*—Philip Goodman
*Assistant Examiner*—John A. Carroll
*Attorney, Agent, or Firm*—Geoffrey R. Myers

[57] ABSTRACT

Provided is a unitized auxiliary lift axle suspension system for wheeled vehicles having frame-to-ground clearance of about 37 inches or more. The suspension system weighs less than about 550 lbs. and usually less than 500 lbs., is certifiable at greater than about 18,000 lbs./axle and is adaptable to a wide variety of vehicle frame widths. The system generally comprises a pair of upwardly biased leaf springs and, for each leaf spring, a spring retaining means for retaining the spring at about its central portion, and air bags located on either end of the spring retaining means, the spring retaining means being sufficiently long to provide a platform for said air bags, but insufficiently long so as to allow the leaf spring to flex below its flat spring condition. The system further comprises spring hanger means having at least one vertical wall for retaining the leaf springs at their ends. The spring hanger means on each end of a leaf spring are joined together by a flexible unitizing frame-connecting member which is sufficiently strong to absorb the force of the upwardly biased spring and which is capable of being connected to the frame member of the vehicle so as to locate a vertical wall of the spring hanger means in line with the vertical wall of the frame (load bearing) member of the vehicle.

24 Claims, 6 Drawing Figures

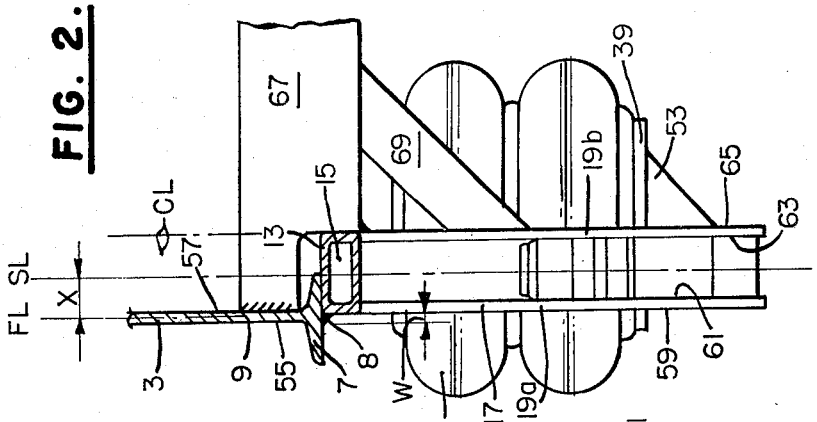
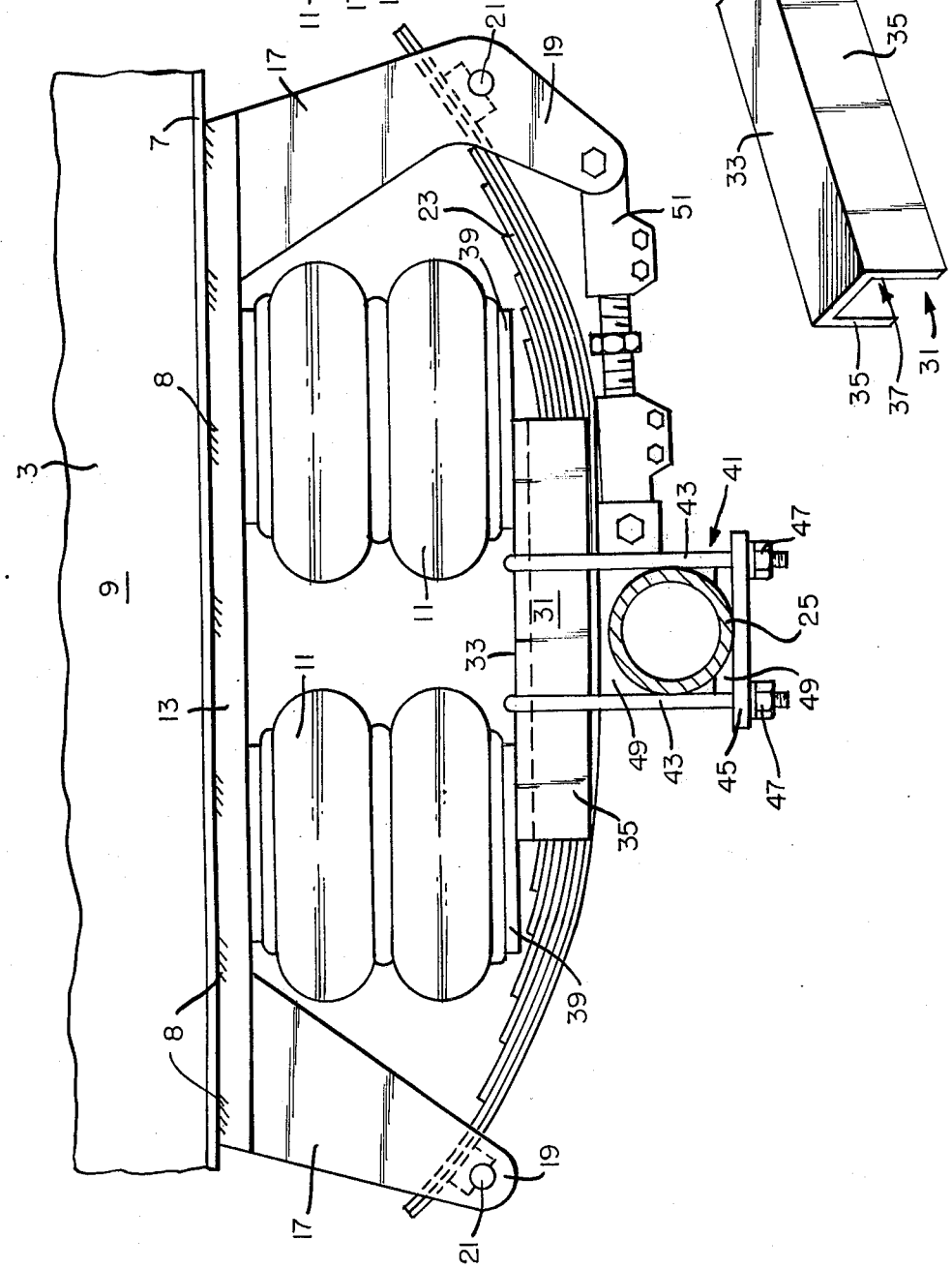

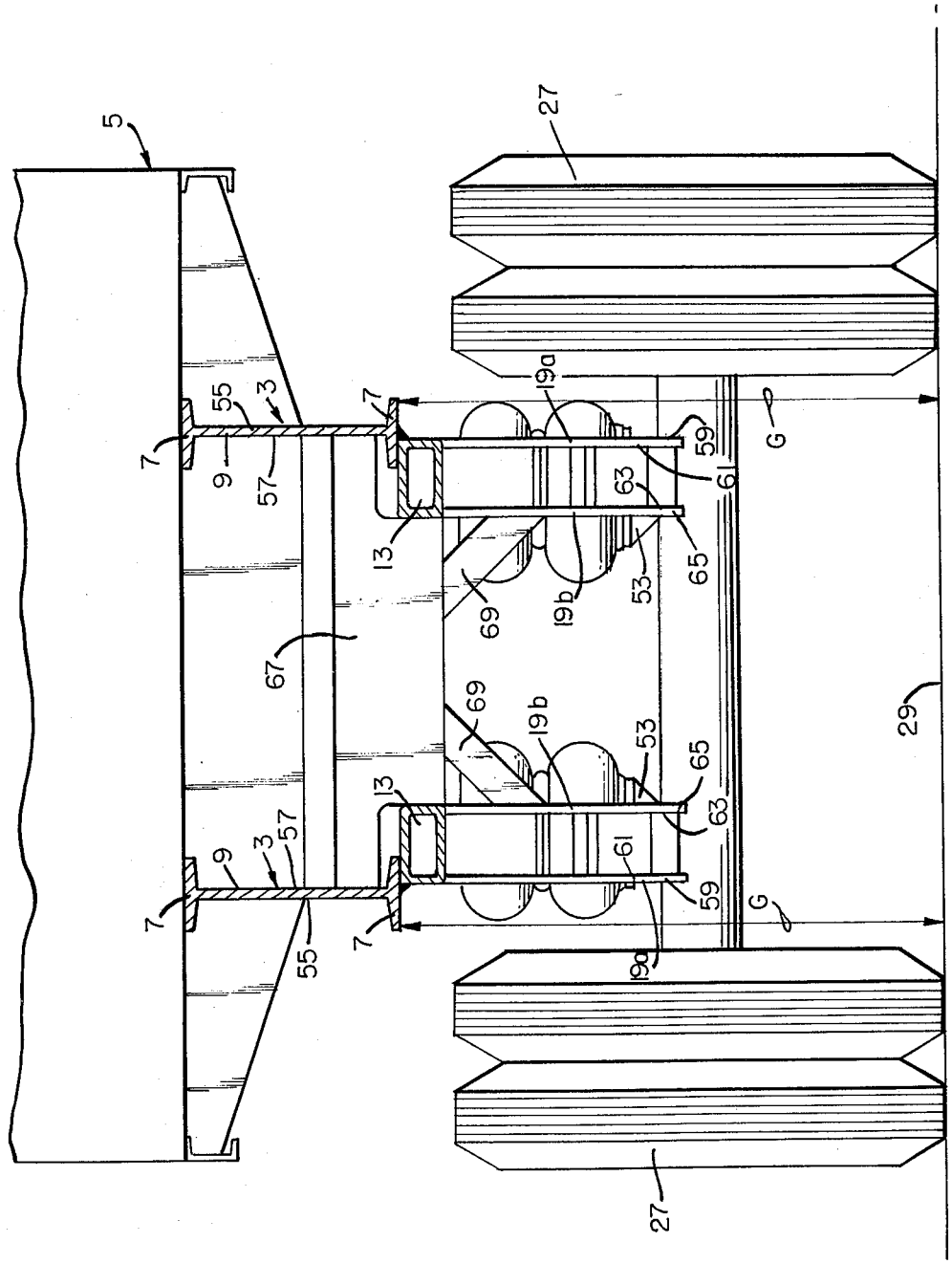

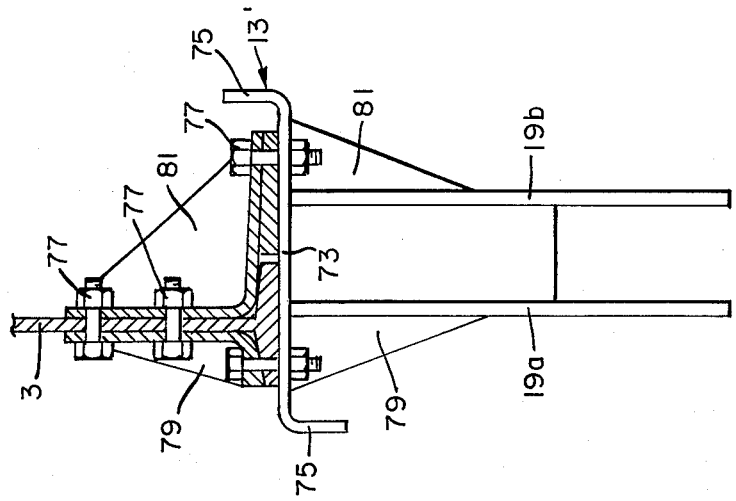
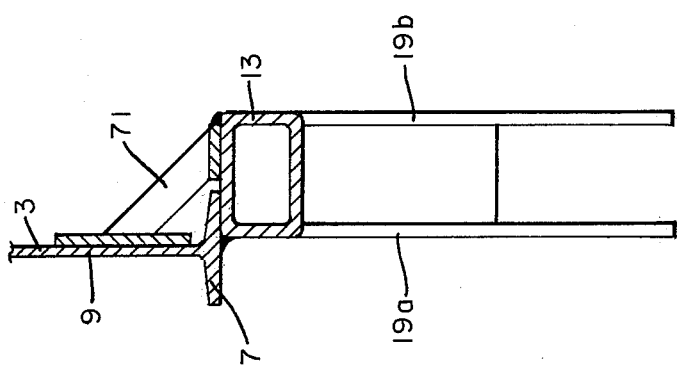

LIGHTWEIGHT HIGH STRENGTH AUXILIARY LIFT AXLE SUSPENSION SYSTEM FOR HIGH FRAMED VEHICLES

This application relates to auxiliary axle suspension systems. More particularly, this application relates to auxiliary lift axle suspension systems particularly adaptable to wheeled vehicles having high frames, said suspension being light weight but exhibiting high strength characteristics.

U.S. Pat. No. 3,285,621 discloses a unique and advantageous auxiliary lift axle system which employs an upwardly biased leaf spring that normally holds the wheel out of engagement with the road surface, in combination with an air bag system such that when the air bags are expanded, they press downwardly against the upward bias of the leaf spring to drive the wheel into engagement with the road surface. Such a system has built within it an automatic lift feature, in that when the air is vented from the air bags, the normally upwardly biased leaf spring, now depressed in its downward position, rapidly returns to its upwardly biased position, thus swiftly lifting the wheel from the road surface.

Certain unique and advantageous improvements to this basic invention are disclosed in U.S. Pat. No. 3,617,072 wherein there is employed a radius rod and a clip angle connection which strengthen the unit to a significant degree, and at the same time overcome a stability problem which occurs when heavy duty axles are employed. The units illustrated therein employ a single air bag per leaf spring and disclose that the leaf springs may flex below their horizontal position to lower an underslung axle sufficiently to get the wheel on the road surface. In practice, these devices have been unitized by employing a relatively inflexible, longitudinally extending frame connecting plate between the spring hangers. U.S. Pat. No. 3,877,718 discloses a further advance in the art by providing a unit adaptable to a wide range of ground-to-frame clearances while incorporating therein both the above-described patentable concepts and extremely high strength as well.

Generally speaking, this is accomplished by a structural combination of elements which locates the air bags and springs (and radius rods, if employed) substantially directly under their respective frame members (load bearing member) of the vehicle while employing a spring retaining means which retains the springs within its confines and also provides a support for longitudinally offsetting the air bags fore and aft of the axle. In practice, such devices are unitized as described hereinabove by relatively inflexible, strong and heavy frame connecting members to which the spring hangers are attached. The frame connecting members are sufficiently strong to allow the leaf spring to be preloaded (i.e. cocked) during manufacturing rather than having to await installation.

The unique devices disclosed in the aforesaid copending application may be quite advantageously used on a wide variety of vehicles having varying ground-to-frame clearance. In practice, however, it was found that trailers and certain other vehicles present unique problems which the illustrated devices are not optimally designed to meet. For example, trailers are usually long vehicles connected to the powered tractor by a fifth wheel. Such a connection raises the frame members (load bearing members) of the trailer to which the auxiliary axle is mounted, an inordinately high distance from the ground. By "inordinately high" is meant a ground-to-frame clearance of greater than about 37 inches and usually between about 38-40 inches (in unloaded condition). It would therefore appear necessary to have to employ heavier and much larger parts in order to provide for the necessary lifting and lowering action attendant such inordinately high ground-to-frame clearance. But such a solution is not desirable since trailers derive their commercial appeal from being as light of weight as possible; thus to maximize payload and profits. The addition to the trailer of a heavy suspension would therefore be, at best, undesirable.

The lightness of these trailers presents an additional problem in that lightness is, in part, achieved by the use of light, relatively flexible frame (load bearing) members to which the auxiliary axle would ordinarily be connected. Because of the flexing which takes place during operation of the trailer, it is desired that the auxiliary axle suspension be capable of "flexing"with it. Yet at the same time, the auxiliary axle suspension should be sufficiently rigid to absorb the force of the pre-loaded, upwardly biased leaf spring in order to allow the suspension to be unitized (i.e. formed as a pre-assembled unit with the spring safely preloaded in the controlled environments of the manufacturing facility), lightweight (as previously stated), and exhibit the high strength characteristics necessary to justify the use of such an auxiliary axle suspension. These desired capabilities are generally antagonistic, one to the other, and their achievement or satisfaction in a single unit presents a very real need in the art.

In addition to the problems occasioned by the requirements for lightness, are those occasioned by the relatively large lengths of trailers and thus the large distances (referred to as "spread") between supporting axles. Such large spreads give rise to increased lateral flexing and forces during trailer operation which are often heavily imposed on an auxiliary axle suspension that finds itself located somewhere within the spread. Thus, the auxiliary suspension must be sufficiently strong, yet flexible, to withstand the stresses imposed on it due to the spread configuration of trailer design.

It is therefore evident that there is a need for an auxiliary lift axle suspension system which incorporates the benefits of the above-cited devices and yet overcomes the described problems in the art. It is the purpose of this invention to fulfill this need and other needs which will become more apparent once given the following detailed description of the invention and various embodiments thereof.

Generally speaking, the subject invention solves the above-described needs in the art by providing a lightweight, high strength auxiliary lift axle suspension system comprising an upwardly biased leaf spring retained at about its central portion by a longitudinally extending spring retaining means of a sufficient length to support at each end thereof vertically expandable air bag means but of insufficient length so as to allow the normally upwardly biased leaf spring to flex downwardly below a flat spring posture, the leaf spring being retained at about its ends by spring hanger means, the spring hanger means being connected to and extending downwardly from a longitudinally extending flexible frame-connecting member capable of absorbing the preload forces of said upwardly biased leaf spring, vertically expandable air bag means located at each end of the spring retaining means and connected at their upper ends to the flexible frame connecting member, such that when the air bags are expanded, they force the leaf spring to move downwardly against the upward bias of the springs.

In the preferred embodiments of this invention, the auxiliary lift axle suspension systems are unitized (manufactured into a unitary structure with preloaded leaf springs). This is accomplished by providing that the flexible frame-connecting member extends longitudinally between the spring hanger means at either end of the leaf spring, thereby unitizing the system.

In still further preferred embodiments, high strength is built into the system. The term "high strength" is well understood in the art, and the term herein is used in accordance with this well-known meaning. Generally speaking, an auxiliary lift axle suspension is considered to be of high strength if it is certifiable at greater than about 18,000 lbs./axle.

The auxiliary lift angle suspension systems of this invention find unique applicability when used on wheeled vehicles wherein the load bearing frame members of the vehicle have inordinately high ground-to-frame clearance. The term inordinately high is used herein to mean that frame-to-ground clearance is usually greater than about 37 inches, and usually between about 38 and 40 inches with the vehicle in unloaded condition. In addition, the preferred axle suspension systems of this invention are also "lightweight". This term is used in accordance with its well-known meaning in the art. Generally speaking, an auxiliary axle suspension system is deemed to be lightweight if without axles, wheels or cross-members, it weighs less than about 550 lbs., and preferably less than about 500 lbs.

Having the above-described features, the preferred embodiments of this invention become uniquely applicable to the "trailer" art, particularly where a trailer is connected to a powered tractor truck by a fifth wheel, and wherein the frame member is of lightweight material (aluminum or steel) which is flexible in nature and wherein such a trailer has inordinately high ground-to-frame clearance. The term "flexible" is understood in the art to describe frame members which usually exhibit more flexing than the normal heavy duty truck frame which is relatively rigid. Thus, the term flexible is used herein in accordance with this meaning.

In certain preferred embodiments of this invention, various components are aligned with respect to the load bearing frame members of the vehicle so as to provide unique strengthening characteristics, particularly against stresses set up during flexing which takes place in the vehicle during operation. In this respect, one of the important high strength aspects of this invention is the ability to locate the upwardly biased leaf spring "substantially directly under" the load bearing frame member of the vehicle to which the axle suspension system is attached. The term substantially directly under as used herein means that at least one vertical plane defined by one of the extremities of the leaf spring (and/or radius rod where employed) falls between the vertical planes of the horizontal extremities of the frame member or vice versa. In other words, that there be a horizontal overlap between the spring and/or the radius rod and the frame member. More precise centering for maximum effect differs, depending upon the various design contingencies. Generally speaking, however, it is usually preferred when employing conventional "C", "L" or "I" frame members and leaf springs and/or radius rods of conventional widths to locate the spring or rod such that the "centerline"(i.e. neutral axis or center of gravity) of the leaf spring or rod will fall between the vertical planes of the horizontal extremities of the frame member.

In addition to this high strength location of the spring or rod members, there is the ability in this invention, as in the invention of the aforesaid U.S. Pat. No. 3,877,718, to substantially transversely spread opposing air bags, one from the other, for better stability and strength. While the amount of spreading achievable in the practice of this invention, may be less than that achievable in the practice of the aforementioned U.S. Pat. No. 3,877,718, a significant spreading effect (albeit inset somewhat from what was achievable in the U.S. Pat. No. 3,877,718) can be obtained because, contrary to various prior art units, the springs are not between the frame and the wheel, but rather under the air bags, thus leaving room for the air bags to be spread. In those instances in the practice of subject invention where it is not possible to obtain maximum spreading, gusset support means are readily provided for obtaining optimum high strength.

An additional strength-adding aspect of this invention, is the ability to locate the spring hanger brackets (which take the force of the ends of the leaf springs, and translate them into the frame member) "in line with" the frame members of the vehicle. This is an important aspect of this invention because of the flexible nature of the frame members and the frame-connecting members, coupled with the need to have the frame connecting member sufficiently rigid to absorb the preload (i.e. be able to retain preloaded spring prior to installation) of the leaf spring. The term in line with is used herein to define the alignment of at least one plate member of the spring hanger means with the vertical web of the frame member of the vehicle so as to form a continuous unbroken line of stress between the vertical plate of the hangers and the vertical wall of the vehicle frame member.

In those embodiments where the suspension is weldably connected to the underside of the vehicle frame member, the in line with nature of the two opposing parts becomes very important in order that flexing does not destroy the weld and thereby the strength of the vehicle. It has been found in this instance of welding, that the in line with nature of the structures is best achieved by providing either that the outboard surface of the vertical web is offset less than about two web widths from the outboard surface of the outboard plate of the hanger means, or that the inboard surface of the vertical web is offset less than about two web widths from the inboard surface of the inboard plate of the hanger means. In those embodiments where bolting or other methods are used, the plate member may be brought in line with the vertical web of the frame member by appropriate gussetting.

This invention will now be described with respect to certain embodiments thereof taken with the accompanying drawings, wherein;

IN THE DRAWINGS

FIG. 1, a side plan, partially sectionalized view, of one embodiment of the subject invention.

FIG. 2 is a rear plan, partially sectionalized view of the embodiment of FIG. 1.

FIG. 3 is a prospective view of a spring retaining means.

FIG. 4 is a real plan, partially schematized, partially sectionalized, view of embodiment of FIGS. 1 and 2.

FIG. 5 is a rear plan, partially sectionalized view of a further embodiment of this invention.

FIG. 6 is a partial plan, partially sectionalized view of a further embodiment of this invention.

Referring now to the embodiment illustrated primarily in FIGS. 1, 2 and 4, there is presented an auxiliary lift axle suspension system generally designated at 1 connected to a typical load-bearing frame member 3 of a wheeled vehicle 5. The vehicle as illustrated in FIG. 4, is a typical trailer bearing two longitudinally extending load bearing frame members 3 usually of the I beam type. Such an I beam is generally comprised of two horizontal flanges 7 connected by a vertical web 9. Typically, the frame-to-ground clearance, indicated as the distance "G", is about 38–40 inches with the trailer in unloaded condition.

As described hereinabove, not only are frame members 3 often relatively lengthy, but they are also usually lightweight (usually made of lightweight steel or aluminum) and thus are relatively flexible. In fact, during operation, these I beams tend to flex in many planes, thereby adding to the difficulty of attaching an auxiliary lift axle suspension system to them which is also light of weight, and yet strong.

As can be seen with reference to FIG. 1 particularly, the auxiliary lift axle suspension system illustrated, is comprised of a pair of vertically flexible air bags 11. While air bags 11 are shown in convoluted form, they may also be of the nonconvoluted (e.g. rolling lobe) type. Air bags 11 are connected at their top end to unitizing lightweight and flexible frame-connecting member 13 which in the embodiment illustrated in FIGS. 1, 2, 4 and 5 constitutes a channel member comprised of four integral walls defining a channel 15 therebetween. Frame-connecting member 13 extends substantially the entire length of axle suspension system 1 and has attached to its lower portions, leaf spring hanger brackets 17.

Leaf spring hanger brackets 17 are generally comprised of two opposing vertically downwardly extending plate members 19 connected at their upper end (preferably by fillet welding) to the lower wall of frame-connecting member 13 and connected at their lower extremities by spring end retaining pins 21.

Spring pins 21 slidably retain leaf spring 23 at about each of its ends. Leaf spring 23 is a normally upwardly biased leaf spring capable of lifting axle 25 sufficiently upwardly so as to raise wheels 27 out of engagement with the road surface. The embodiment illustrated in FIG. 4 shows the suspension system in its down position in that air bags 11 are expanded and wheels 27 are engaged with the road surface 29. In the embodiment illustrated in FIG. 1, the leaf spring 23 is upwardly biased to its retracted position, in which it is actually bowed downwardly after preloading, below its horizontal (flat spring) condition. The ability to allow upwardly biased leaf spring 23 to exist, even in its normally upwardly biased position, below its flat spring condition, allows for spring hanger brackets 17 to be of relatively short length, thereby eliminating the need for excess materials and decreasing the weight of the suspension.

An important feature in the achievement of a downwardly bowed leaf spring, is the employment of a spring retaining means 31 which as best illustrated in FIG. 3, comprises an upper horizontal longitudinally extending surface 33 and two downwardly extending vertical walls 35 integral with and connected to the lateral edges of the upper horizontal surface 33 thereby defining a spring retaining channel 37 therewithin. As illustrated in FIG. 1, spring retaining channel 37 houses at least a portion of the upwardly biased leaf spring 23. Spring retaining means 31 is of sufficient length such that the upper horizontal surface 33 provides sufficient distance to support the lower portions of the air bags 11, thus allowing the air bags to exist between upper horizontal surface 33 and the lower surface of frame connecting member 13. This is achieved, in most instances, by a supporting plate means 39 for each air bag 11 which is rigidly connected to the upper horizontal surface 33 but extends therebeyond. At the same time, spring retaining means 31 is not so long that it interferes with the operation of leaf spring 23. This means that, as illustrated, leaf spring 23 in its retracted but preloaded condition will be bowed downwardly below its flat condition, and will bow downwardly even further when air bags 11 are expanded to drive the wheels 27 into road engagement. In a like manner, support plates 39 will be of requisite size so as to avoid interfering with the operation of leaf spring 23, but must not be so elevated as to provide too little space between themselves and frame connecting member 13 so that air bags 11 cannot be placed therebetween.

Axle 25 is connected to auxiliary axle suspension system 1 by way of U-bolt retaining means 41 comprised of a pair of U-bolts 43 which at their "U" end overlap spring retaining means 31 and which at their leg ends extend through orifices presented in lower retaining plate 45 and are connected thereto by nut means 47. Axle connecting means 41 further comprises a pair of axle saddle connections 49 which generally adopt the cylindrical circumferential shape of axle 25 to the substantially flat shape of the surface of the lower leaf of spring 23 and the flat surface of plate 45.

In the preferred embodiments of this invention, there is also employed a radius rod or torque arm 51 for adding strength and stability to the system. Preferably, torque arm 51 is connected at one end to the lower extension of hanger bracket 17 (either the forward or the aft hanger bracket) and to saddle means 49 at the other end.

In certain embodiments of this invention, and as shown particularly in FIG. 2, it may be necessary or desirable to offset the centerline CL of air bags 11 a significant distance from the centerline SL of spring 23 and hanger bracket means 17 and from the centerline FL of load-bearing frame member 3. While this offset, in many instances, is significantly less than certain outboard leaf-spring devices heretofore employed, such an offset requires for optimum high strength, the use of a small reinforcing gusset 53 connected between vertical wall 35 of a spring retaining means 31, and lower plate 39. Vertical walls 35 of spring retaining means 31 with or without gusset 53 are called upon when air bags 11 are offset, to take certain torsional forces particularly in view of the upwardly biased nature of leaf spring 23. Thus walls 35 in combination with upper surface 33, must be of a size sufficient to be able to absorb the "torsional" forces placed upon them by the offsetting of air bags 11. Because of the uniqueness of the subject invention, this is readily accomplished using only conventional materials and thus eliminating undue weight. A typical example of wall sizes is a spring retaining means length of about 26 inches, with walls 35 height of about 3 inches and upper surface 33 width of about 4 inches.

As best illustrated in FIG. 2, leaf spring 23 is readily locatable, substantially directly under frame member 3. In this respect, distance X should be no greater than herein described above in relation to the definition of the term substantially directly under for optimum strength.

The embodiment illustrated in FIGS. 1, 2, 4 and 5 discloses the employment of a frame-connecting member 13 weldably connected by spot welds 8 to load-bearing member 3. As stated hereinabove, frame-connecting member 13 must be flexible so as to be capable of flexing with load-bearing frame member 3 during operation of the vehicle. In addition, frame-connecting member 13 must be sufficiently rigid so as to be able to accept the preloaded leaf spring stresses, thereby enabling device 1 to be utilized in that leaf springs 23 may be precocked (preloaded) during the manufacturing operation and within the confines of the safety of that environment, rather than leaving it to the installer to have to precock leaf spring 23. It has been found, that the configuration as illustrated in these figures for flame-connecting member 13 can be achieved by using conventional materials which are sufficiently light of weight to allow for flexing (standard relatively lightweight steel) yet rigid enough to accept the preload of spring 23 without adding undue weight to the system.

For the achievement of optimum high strength, frame-connecting members 13 should be capable of locating the axle suspension system under frame members 3 so as to bring the hanger bracket means 17 in line with load-bearing frame member 3, as defined hereinabove. In this respect, weldability demands, for purposes of optimum strengthening, that the in line with nature of the alignment be such that certain offsetting relationships and limits thereto be established between the various walls of load-bearing member 3 and the walls of the relavent plate members 19 of leaf spring hanger bracket 17 so as to achieve this strength, and the general characteristic of a continuum of stress factors. As illustrated best in FIG. 2, vertical web 9 may be said to have an outboard surface 55 and an inboard surface 57. In addition, outboard plate member 19a may be said to have an outboard surface 59 and an inboard surface 61 while inboard plate member 19b may be said to have an outboard surface 63 and an inboard surface 65.

When one wishes to locate centerline SL inboard of centerline FL, then, in order to obtain optimum high strength, the distance W, which is the distance between the outboard surface 55 of vertical web 9 and the outboard surface 59 of outboard plate member 19a should not be greater than about two web widths (i.e. one web width = thickness of web 9). If, on the other hand, centerline SL were to the outboard side of centerline FL, then the inboard surface 57 of vertical web 9 should not be offset greater than about two web widths from the inboard surface 65 of inboard plate means 19b. In other words, the weldment should be aligned with the web so as to minimize stress on the weld due to flexing of both frame 3 and connecting member 13.

The embodiments in FIGS. 1, 2 and 4 illustrate a suspension system in which there are provided crossbeam members 67 and gusset reinforcing means 69 for connecting opposing suspensions together as well as to each of the longitudinally extending load-bearing frame members 3 of the vehicle. It is not always necessary that these cross-members 67 and gusset means 69 be provided for high strength. For example, and as illustrated in the embodiment of FIG. 5, high strength is also readily achievable without cross-members by way of a gussetting means 71. The embodiments which utilize cross-members 67 and gusset means 69 (which are connectable between the cross-members and the inboard plate 19b of spring hanger bracket 17) are employed where axle suspension system 1, taken as a whole, is desired to be as rigid as possible and each suspension (the right hand suspension and the left hand suspension) do not necessarily have to flex independently one of the other. On the other hand, there are instances where it is desirable for optimum strengthening purposes, and particularly where very light weight and highly flexible frame members 3 are experienced, to have each of the lift axle suspensions on either side of the vehicle (connected to each of the separate longitudinally extending load-bearing frame members 3) flex independently one from the other. Thus, the need for the independent embodiment shown in FIG. 5.

In either event, it can be seen that the axle suspension systems of this invention are readily adaptable to varying widths between frame members 3. This is because, in the embodiment of FIG. 5, the suspension system on either side of the vehicle is independent, one from the other, in that they are connected only by the axle whose spacing can be adjusted via loosening of the U-bolt means 43. In the embodiments employing cross-members, these cross-members can be supplied "on the job" during installation to take into consideration the varying widths between frame members 3.

It is not always possible, or desirable, to employ a weldment between the frame-connecting members 13 and frame members 3. In addition, it is not always necessary for the achievement of this invention, to employ a channel-like section for frame-connecting member 13 as illustrated in the aforementioned embodiments. Other constructions for frame-connecting member 13 and its connection to load-bearing frame member 3 may be employed provided that they fulfill the above-described requirements.

An example of a further embodiment wherein weldment is not employed and a different configuration for frame-connecting member 13 is readily useful, is illustrated in FIG. 6. In this figure there is provided a typical load-bearing frame member 3 and a frame-connecting member 13' which is comprised of a substantially horizontal plate portion 73 having at either end thereof and integrally connected therewith, vertically extending walls 75. Such a configuration provides the necessary rigidity for accepting the preload forces of the leaf spring, while, at the same time, providing a lightweight, flexible, frame-connecting member 13'.

Since weldment is not employed, but rather bolt means such as are illustrated at 77 to connect member 13' to frame member 3, the offsetting locations as described hereinabove in regard to the inboard and outboard surfaces are not applicable. On the other hand, the in line with nature of the structure is important for high strength and for this reason, a gusset member should be provided such as gusset member 79 so as to translate the forces projected by way of planes 19a and 19b in as straight a line as possible as hereinabove described. In addition, gusset means 81 may be provided so as to make the suspension independent of its corresponding suspension connected to the other longitudinally extending frame member. On the other hand, gussets 81 may be eliminated and cross-member 67 and 69 may be substituted therefore if it is desired to make one dependent on the other.

The operation of the device, is generally that as described in U.S. Pat. No. 3,285,621. The disclosure of this patent is incorporated herein by reference. Generally speaking, air, taken by way of the operation of conventional value means, expands air bags 11. Valve means are also provided so as to allow air to be vented from the air bags. During expansion of the vertically extensible air bags 11, air bags 11 push downwardly against the upper surface of spring retaining means, which in turn presses downwardly against the normally upward biased leaf spring 23, thereby driving wheels 27 into road engagement. When air is vented from air bags 11, the normal upward bias of leaf springs 23 "snap" wheels 27 off the road surface.

The above-described devices are readily manufactured in a unitary (unitized) form ready for installation on the vehicle either by way of mere attachment to the frames thereof, or by the addition of cross-members. The devices, furthermore have sufficient operating range to allow them to be used on vehicles of inordinately high ground-to-frame clearance. In addition, flexibility is provided so as to take the flexing action of the frame members of the vehicle during operation thereof. Despite this flexing action, and the obtention of unitization through a sufficiently rigid frame-connecting member, high strength is obtainable, and these units are generally certifiable at greater than about 18,000 lbs./axle, and at times significantly higher than this. And yet, despite this high strength, the axle suspension systems of this invention, which include the parts for connecting to both of the frame members of the vehicle, weigh less than approximately 550 lbs. and usually significantly less than about 500 lbs. (without wheels, axle or cross-members) and thereby more than justify their use economically on the vehicle.

Once given the above disclosure, many other features, modifications and improvements will become apparent to the skilled artisan. Such other features, modifications and improvements are therefore considered to be a part of this invention, the scope of which is to be determined by the following claims:

I claim:

1. A high strength auxiliary lift axle suspension system for use in a vehicle having longitudinal flexible frame members which are comprised of a horizontal flange and a vertical web member, said system comprising a pair of upwardly biased leaf springs for normally retaining said lift axle in its lifted position, each leaf spring being retained at about its central portion by a longitudinally extending spring retaining means supporting at each end thereof vertically flexible air bag means which when expanded, work against the upward bias of said leaf springs to lower said lift axle to its road travel position, each leaf spring being retained at its ends by spring hanger means which are connected together by a frame-connecting member for connecting the system to said longitudinal flexible frame members of the vehicle, said air bag means extending between said frame-connecting member and spring retaining means, said frame-connecting member being a flexible unitizing frame-connecting member extending between said spring hanger means and including a horizontal flange for connecting said system to the horizontal flange of the flexible frame member of the vehicle and a vertical web member which is offset a spaced distance from and does not contact with the vertical web member of the flexible frame member of the vehicle when the horizontal flange of the frame-connecting member is connected to the horizontal flange of the frame member of the vehicle, the structure of said flexible frame-connecting member extending between said spring hanger means enabling said system to withstand the preload forces of said leaf springs prior to connection of the system to the flexible frame members of the vehicle.

2. An auxiliary lift axle suspension system according to claim 1 weighing, without axle, wheels or cross-members, less than about 550 lbs.

3. An auxiliary lift axle suspension system according to claim 1 weighing, without axle, wheels or cross-members, less than about 500 lbs.

4. An auxiliary lift axle suspension system according to claim 1 which further includes an axle retaining means for locating an axle below said leaf spring, said axle retaining means being connected to the central portion of said spring retaining means.

5. An auxiliary lift axle suspension system according to claim 1 wherein said leaf springs are located substantially directly under said flexible frame-connecting member.

6. An auxiliary lift axle suspension system according to claim 4 wherein said system is light-weight and structured to be connected to two spaced longitudinally extending flexible frame members of a vehicle and which includes a pair of opposing flexible frame-connecting members, each having associated therewith a respective upwardly biased leaf spring, spring hanger means, and leaf-spring retaining means, and wherein said opposing frame-connecting members are free of interconnection one from the other such that the system is adjustably adaptable via said axle retaining means to the spacing between said two flexible vehicle frame members.

7. An auxiliary lift axle suspension system according to claim 6 which includes reinforcing cross-members extending between said pair of opposing flexible frame-connecting members.

8. An auxiliary lift axle suspension system according to claim 1 wherein said flexible frame-connecting members is a hollow channel member.

9. An auxiliary lift axle suspension system according to claim 8 wherein said member is weldably connectable to a vehicle frame member.

10. An auxiliary lift axle suspension system according to claim 1 wherein said flexible frame-connecting member is an integral plate means comprising in cross-section horizontal plate portion whose edges terminate in vertically extending plate portions.

11. An auxiliary lift axle suspension system according to claim 1 wherein said spring retaining means comprises a substantially horizontal, longitudinally extending upper surface and said air bags are connected to the ends of said upper surface.

12. An auxiliary lift axle suspension according to claim 11 wherein said air bags are connected to said upper surface by a support plate means secured to the lower surface of said air bags, said support plate means contacting said upper surface but extending longitudinally beyond the ends of said upper surface, said support plate means being sufficiently elevated and of insufficient size so as to allow the leaf spring to flex below its flat spring posture.

13. An auxiliary lift axle suspension system according to claim 11 wherein said spring retaining means further includes vertical, longitudinal walls extending downwardly from the edges of said upper surface, thereby defining within its confines a walled spring retaining chamber in which said leaf spring is located.

14. An auxiliary lift axle suspension system according to claim 13 wherein the centerline of said air bags is offset from the centerline of said leaf spring and the walls of said spring retaining chamber are of sufficient size to absorb the torsional effect of said offset air bags.

15. In a wheeled vehicle having two longitudinally extending flexible load bearing frame members on either side of said vehicle having a ground-to-frame clearance greater than about 37 inches, said vehicle bearing a first axle suspension system as a primary means of support and an auxiliary lift axle suspension system as an additional support means, the improvement comprising as said auxiliary lift axle suspension system the system of claim 1.

16. The wheeled vehicle according to claim 15 wherein said lift axle system includes an axle and wheels connected thereto and wherein said system is capable of being certified at greater than about 18,000 lbs./axle.

17. The wheeled vehicle according to claim 15 wherein said vehicle is a trailer and said lift axle system includes an axle retaining means for locating the axle below said leaf springs and is connected to the central portion of said spring retaining means, said lift axle system further including a radius rod extending between said axle retaining means and said spring hanger means, said spring hanger means comprising for each end of said leaf springs, a pair of spaced, opposing downwardly extending plates being connected at their upper ends to their respective flexible frame-connecting member and at their lower ends by a leaf spring retaining pin, said frame-connecting member being connected to its respective flexible load bearing frame member so as to locate one of said opposing downwardly extending plates in line with the vertical wall means of the flexible load bearing frame member of said trailer.

18. In a wheeled vehicle having two longitudinally extending, flexible load-bearing frame members on either side of said vehicle, said vehicle bearing a first axle suspension system as a primary means of support and an auxiliary lift axle suspension system as an additional support means, the improvement comprising as said auxiliary lift axle suspension system, the system of claim 1, wherein said spring hanger means comprise a pair of spaced, opposing downwardly extending plates being connected at their upper ends to said flexible frame-connecting member and at their lower ends by a leaf spring retaining pin, and wherein one of said opposing downwardly extending plates is in line with the vertical wall means of the frame member of said vehicle.

19. The wheeled vehicle of claim 18 wherein the vertical wall means of said frame member of said vehicle is the vertical web of a beam, said web having an outboard surface and an inboard surface and wherein said opposing downwardly extending plates comprise an outboard plate and an inboard plate, each having outboard and inboard surfaces, and wherein said flexible frame member of said vehicle is weldably connected to said flexible frame-connecting member.

20. The vehicle of claim 19 wherein the outboard surface of the vertical web is offset less than about two web widths from the outboard surface of said outboard plate.

21. The vehicle of claim 19 wherein the inboard surface of the vertical web is offset less than about two web widths from the inboard surface of said inboard plate.

22. The vehicle according to claim 18 wherein gusset means are provided between the vertical wall of said frame member and said frame-connecting member.

23. A system according to claim 1 wherein said longitudinally extending spring retaining means is of insufficient length so as to allow the normally upwardly biased leaf spring to flex downwardly below a flat spring posture.

24. A system according to claim 23 wherein said upwardly biased leaf spring is in a configuration bowed downwardly below its flat posture when retaining said lift axle in its lifted position.

* * * * *